(12) United States Patent
Kurth

(10) Patent No.: US 10,641,375 B2
(45) Date of Patent: May 5, 2020

(54) DRIVE SYSTEM FOR A MOTOR VEHICLE

(71) Applicant: Schaeffler Technologies AG & Co. KG, Herzogenaurach (DE)

(72) Inventor: Franz Kurth, Nürnberg (DE)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 44 days.

(21) Appl. No.: 15/770,610

(22) PCT Filed: Nov. 23, 2016

(86) PCT No.: PCT/DE2016/200539
§ 371 (c)(1),
(2) Date: Apr. 24, 2018

(87) PCT Pub. No.: WO2017/088874
PCT Pub. Date: Jun. 1, 2017

(65) Prior Publication Data
US 2018/0306298 A1  Oct. 25, 2018

(30) Foreign Application Priority Data

Nov. 24, 2015 (DE) .................. 10 2015 233 131

(51) Int. Cl.
*F16H 48/36* (2012.01)
*F16H 48/11* (2012.01)
(Continued)

(52) U.S. Cl.
CPC ............. *F16H 48/36* (2013.01); *B60K 17/00* (2013.01); *B60K 23/04* (2013.01); *F16H 48/11* (2013.01);
(Continued)

(58) Field of Classification Search
CPC ........ F16H 37/082; F16H 48/10; F16H 48/30; F16H 48/36; F16H 48/38; F16H 2048/343; F16H 2048/364; F16H 2048/382
(Continued)

(56) References Cited

U.S. PATENT DOCUMENTS 8,430,779 B2  4/2013 Hoehn
2016/0003337 A1*  1/2016 Smetana ............... F16H 48/36
475/5

FOREIGN PATENT DOCUMENTS

DE  102007017185 A1  12/2009
DE  102009049856 B2  4/2011
(Continued)

OTHER PUBLICATIONS

International Search Report for PCT/DE2016/200539; 2 pgs; dated Apr. 13, 2017 by European Patent Office.

*Primary Examiner* — Leslie A Nicholson, III
(74) *Attorney, Agent, or Firm* — Reid A. Baldwin

(57) ABSTRACT

A drive system for a motor vehicle includes a torque vectoring unit and a differential. The torque vectoring unit has an electrical machine for producing a torque. The differential has a common planet carrier, a first sun gear, a second sun gear, a first planetary gear set and a second planetary gear set. The first planetary gear set is rotatably mounted on the common planet carrier and in meshing engagement with the first sun gear. The second planetary gear set is rotatably mounted on the common planet carrier, in meshing engagement with the second sun gear and the first planetary gear set, connected to the torque vectoring unit, and arranged to redistribute the torque between the first sun gear and the second sun gear.

8 Claims, 1 Drawing Sheet

(51) Int. Cl.
 *B60K 17/00* (2006.01)
 *B60K 23/04* (2006.01)
 *F16H 48/10* (2012.01)

(52) U.S. Cl.
 CPC ..... *B60K 2023/043* (2013.01); *B60Y 2300/82* (2013.01); *F16H 2048/106* (2013.01); *F16H 2048/364* (2013.01)

(58) Field of Classification Search
 USPC .......................................................... 475/150
 See application file for complete search history.

(56) References Cited

FOREIGN PATENT DOCUMENTS

| | | | | |
|---|---|---|---|---|
| DE | 102009059903 A1 * | 6/2011 | ............... | B60K 1/02 |
| DE | 102009059903 A1 | 6/2011 | | |
| DE | 102010036239 A1 | 3/2012 | | |
| DE | 102010036241 A1 | 3/2012 | | |
| DE | 102010045876 A1 | 3/2012 | | |
| DE | 102011079975 A1 | 1/2013 | | |
| EP | 2272701 A2 | 1/2011 | | |
| EP | 2272701 B1 * | 3/2014 | ............... | B60K 1/02 |
| EP | 3348867 A1 * | 7/2018 | ............... | F16H 48/11 |
| WO | 2013013841 A1 | 1/2013 | | |
| WO | 2014191091 A1 | 12/2014 | | |

* cited by examiner

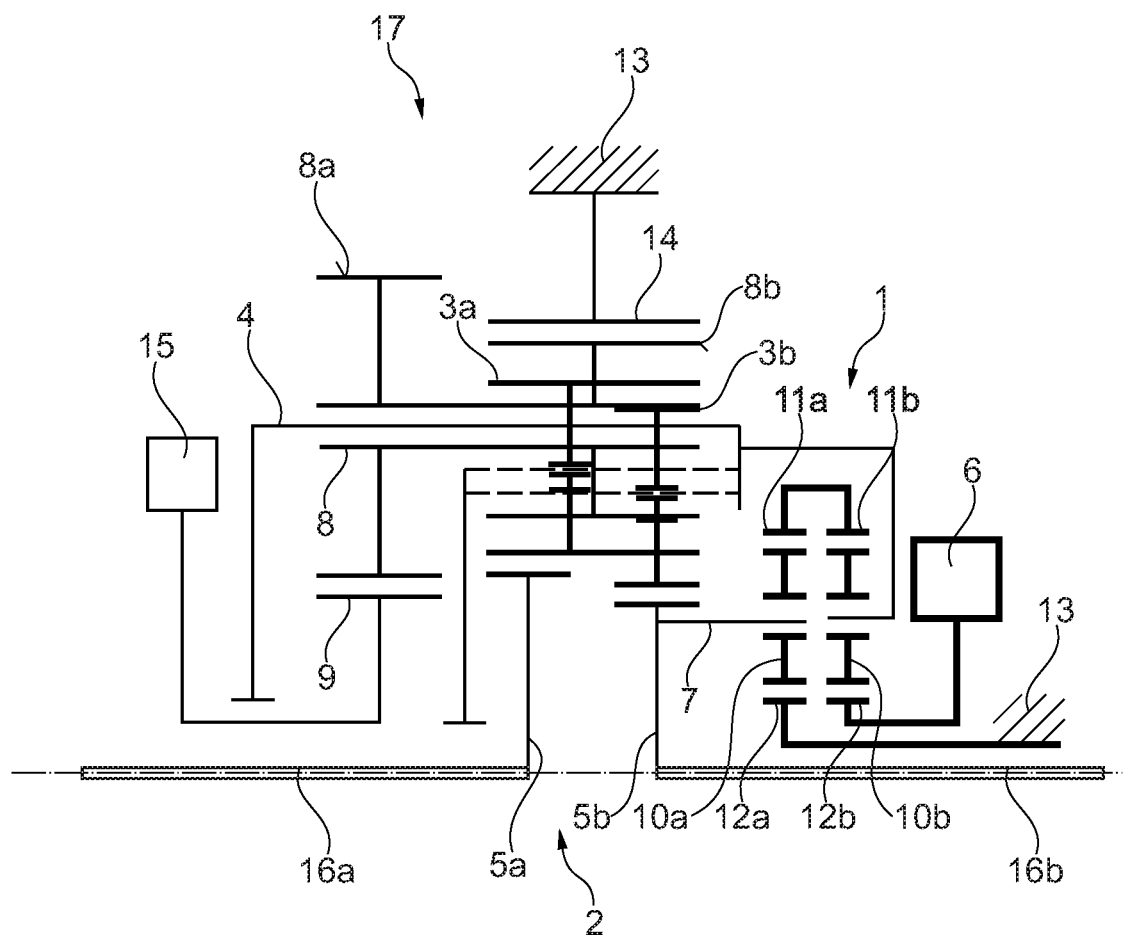

DRIVE SYSTEM FOR A MOTOR VEHICLE

CROSS-REFERENCE TO RELATED APPLICATIONS

This application is the United States National Phase of PCT Appln. No. PCT/DE2016/200539 filed Nov. 23, 2016, which claims priority to German Application No. DE102015223131.3 filed Nov. 24, 2015, the entire disclosures of which are incorporated by reference herein.

TECHNICAL FIELD

The present disclosure relates to a drive system for a motor vehicle.

BACKGROUND

DE 10 2011 079 975 A1 discloses a drive system for a motor vehicle. The drive system includes a differential and a planetary transmission stage. The differential is designed as a cylindrical gear differential and has an epicyclic gear housing and a first cylindrical gear accommodated therein and a second cylindrical gear accommodated therein. The planetary transmission stage is kinematically coupled to the epicyclic gear housing and includes a sun gear, planet gears and a ring gear. The planet gears of the planetary transmission stage are of stepped design and each form a first planetary cylindrical gear section and a second planetary cylindrical gear section, which is arranged coaxially with and offset axially relative to said first section. The first planetary cylindrical gear section is in engagement with the sun gear, and the second planetary cylindrical gear section is in engagement with the ring gear. The planet gears furthermore revolve together with the epicyclic gear housing.

BRIEF SUMMARY

The drive system according to the present disclosure for a motor vehicle includes a differential and a torque vectoring unit with an electrical machine. The differential has a first and a second planetary gear set, which are rotatably mounted on a common planet carrier. The first planetary gear set meshes at least with a first sun gear, the second planetary gear set meshes at least with a second sun gear and the two planetary gear sets mesh with each other, at least in pairs. The second sun gear is connected to the torque vectoring unit in order to redistribute the torque between the first and second sun gears. In particular, the common planet carrier is connected at least indirectly to an electric drive motor in order to feed in a torque.

The electrical machine brings about redistribution of a torque fed into the differential between the two planetary gear sets and thus also between the two sun gears. On the one hand, uniform driving of both sun gears is possible in this way. On the other hand, it is also possible to introduce the full torque into a single sun gear.

The present disclosure includes the technical teaching that the first sun gear is connected to a first output shaft and the second sun gear is connected to a second output shaft. The respective output shaft may be connected to a respective wheel on a drive axle of the vehicle. The redistribution of the torque to a sun gear gives rise to a yawing moment about the vertical axis of the vehicle, thereby making it possible to selectively influence the driving dynamics. If, on the other hand, the torque vectoring unit distributes the entire torque from one sun gear to the other sun gear, the yawing moment can be applied in the opposite direction. The yawing moment is thus adjusted in an infinitely variable manner via control of the torque at the torque vectoring unit.

As a particular embodiment, a stepped planetary gear set is rotatably mounted on the common planet carrier. The stepped planetary gear set has a first and a second toothing region. The first toothing region meshes with an input sun gear. The second toothing region meshes with a ring gear fixed so as to be stationary. Consequently, the stepped planetary gear set belongs to a speed-transforming gear unit arranged ahead of the differential and revolves with the common planet carrier. In particular, the input sun gear is connected to the electric drive motor.

The second sun gear may be connected to a first planet carrier of the torque vectoring unit. The common planet carrier is furthermore connected directly to the torque vectoring unit. In other words, a planetary gear set of the torque vectoring unit is rotatably mounted on the common planet carrier.

In particular, the torque vectoring unit includes a first and a second planetary gear set. The first planetary gear set is rotatably mounted on the first planet carrier and meshes radially between a first ring gear and a first sun gear. The second planetary gear set is rotatably mounted on the common planet carrier and meshes radially between a second ring gear and a second sun gear. Consequently, apart from the first planetary gear set of the torque vectoring unit, all three planet gears and the stepped planetary gear set are arranged on the common planet carrier.

As a further embodiment, the first sun gear is fixed so as to be stationary on a housing and the second sun gear is connected to the electrical machine. In particular, the first and second ring gears are connected to one another for conjoint rotation.

BRIEF DESCRIPTION OF THE DRAWINGS

Further measures that improve the present disclosure are explained in greater detail below together with the description of an illustrative embodiment of the present disclosure with reference to the single FIGURE. The single FIGURE shows a simplified schematic depiction intended to illustrate the construction of a drive system according to the present disclosure.

DETAILED DESCRIPTION

According to the single FIGURE, a drive system according to the present disclosure for a motor vehicle—not shown here—has a differential 2, a speed-transforming gear unit 17 and a torque vectoring unit 1 with an electrical machine 6. The differential 2 includes a first and a second planetary gear set 3a, 3b as well as a common planet carrier 4, on which the two planetary gear sets 3a, 3b are rotatably mounted. A stepped planetary gear set 8 of the speed-transforming gear unit 17 is furthermore rotatably mounted on the common planet carrier 4. The stepped planetary gear set 8 has a first and a second toothing region 8a, 8b. The first toothing region 8a meshes with an input sun gear 9 and the second toothing region 8b meshes with a ring gear 14, which is fixed so as to be stationary on a housing 13.

To introduce a torque into the differential 2, the input sun gear 9 is connected to the electric drive motor 15. In this case, the torque is passed from the input sun gear 9, via the stepped planetary gear set 8, to the common planet carrier 4. The torque introduced is distributed between the two planetary gear sets 3a, 3b by means of the common planet carrier 4. The first planetary gear set 3a meshes with a first sun gear 5a and the second planetary gear set 3b meshes with a second sun gear 5b. Furthermore, the two planetary gear sets 3a, 3b mesh with one another as a pair. Consequently, the two planetary gear sets 3a, 3b are designed as differential planetary gear sets.

The first sun gear 5a is connected to a first output shaft 16a, and the second sun gear 5b is connected to a second output shaft 16b. Furthermore, the second sun gear 5b is connected to the torque vectoring unit 1 for the purpose of redistributing the torque between the two planetary gear sets 3a, 3b and thus also of redistributing the torque between the first and the second sun gear 5a, 5b. Furthermore, the common planet carrier 4 is connected to the torque vectoring unit 1 for the purpose of redistributing the torque between the two planetary gear sets 3a, 3b and thus also of redistributing the torque between the first and the second sun gear 5a, 5b.

The torque vectoring unit 1 includes a first and a second planetary gear set 10a, 10b. The first planetary gear set 10a is rotatably mounted on a first planet carrier 7 and meshes radially between a first ring gear 11a and a first sun gear 12a. The second planetary gear set 10b is rotatably mounted on the common planet carrier 4 and meshes radially between a second ring gear 11b and a second sun gear 12b. Consequently, the stepped planetary gear set 8 of the speed-transforming gear unit 17, the two planetary gear sets 3a, 3b of the differential 2, and the second planetary gear set 10b of the torque vectoring unit 1 are rotatably mounted on the common planet carrier 4. The two ring gears 11a, 11b are connected to one another for conjoint rotation. Furthermore, the first sun gear 12a is fixed so as to be stationary on the housing 13, and the second sun gear 12b is connected to the electrical machine 6. The first planet carrier 7 of the torque vectoring unit 1 is connected to the second sun gear 5b of the differential 2.

LIST OF REFERENCE NUMERALS 1 torque vectoring unit
2 differential
3a, 3b planetary gear set
4 common planet carrier
5a, 5b sun gear
6 electrical machine
7 planet carrier
8 stepped planetary gear set
8a, 8b toothing region
9 input sun gear
10a, 10b planetary gear set
11a, 11b ring gear
12a, 12b sun gear
13 housing
14 ring gear
15 electrical drive motor
16a, 16b output shaft
17 speed-transforming gear unit

The invention claimed is:

1. A drive system for a motor vehicle comprising:
    a torque vectoring unit with an electrical machine for producing a torque and a first planet carrier; and,
    a differential comprising:
        a common planet carrier;
        a first sun gear;
        a second sun gear fixedly coupled to the first planet carrier;
        a first planetary gear set, rotatably mounted on the common planet carrier and in meshing engagement with the first sun gear;
        a second planetary gear set:
            rotatably mounted on the common planet carrier; and
            in meshing engagement with the second sun gear and the first planetary gear set.

2. The drive system of claim 1 wherein the torque vectoring unit comprises:
    a first planetary gear set rotatably mounted on the first planet carrier and radially meshed between a first ring gear and a first sun gear; and,
    a second planetary gear set, rotatably mounted on the common planet carrier and radially meshed between a second ring gear and a second sun gear.

3. The drive system of claim 2 wherein the first ring gear and the second ring gear are fixedly coupled to one another for conjoint rotation.

4. The drive system as claimed in claim 1 wherein the common planet carrier is fixedly coupled to the torque vectoring unit.

5. The drive system claim 1 further comprising:
    a stepped planetary gear rotatably mounted on the common planet carrier and including a first toothing region and a second toothing region;
    an input sun gear; and,
    a stationary ring gear, wherein:
        the first toothing region is in meshing engagement with the input sun gear; and,
        the second toothing region is in meshing engagement with the stationary ring gear.

6. The drive system of claim 5 wherein the input sun gear is fixedly coupled to an electric drive motor.

7. The drive system of claim 1 further comprising a first output shaft and a second output shaft, wherein the first sun gear is fixedly coupled to the first output shaft and the second sun gear is fixedly coupled to the second output shaft.

8. The drive system as claimed in claim 7 wherein the first sun gear is fixed stationary on a housing and the second sun gear is fixedly coupled to the electrical machine.

* * * * *